Dec. 17, 1935.　　　　G. W. PENNEY　　　　2,024,743
HEAT TRANSFER SURFACE
Filed Sept. 18, 1934　　　　2 Sheets—Sheet 1

WITNESSES:

INVENTOR
Gaylord W. Penney,
BY
ATTORNEY

Dec. 17, 1935.　　　　　G. W. PENNEY　　　　　2,024,743
HEAT TRANSFER SURFACE
Filed Sept. 18, 1934　　　　　2 Sheets-Sheet 2
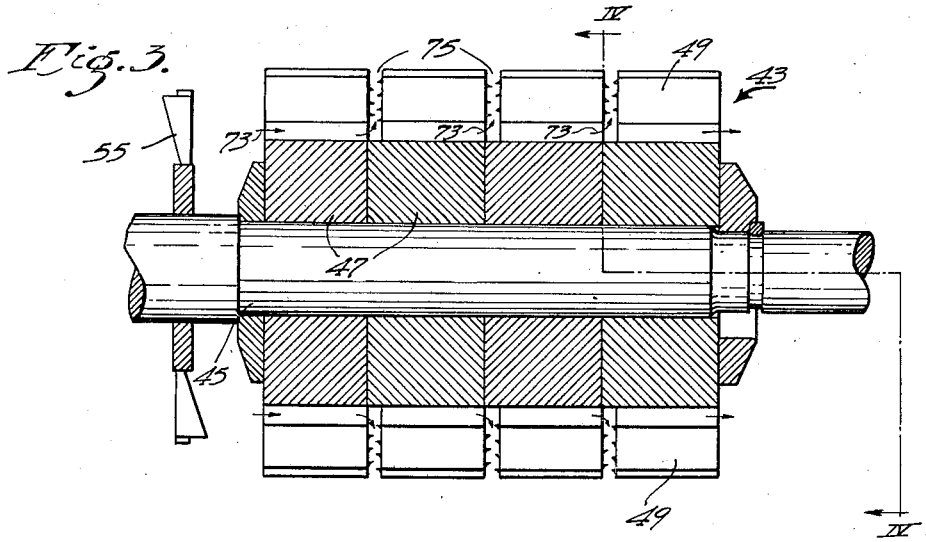
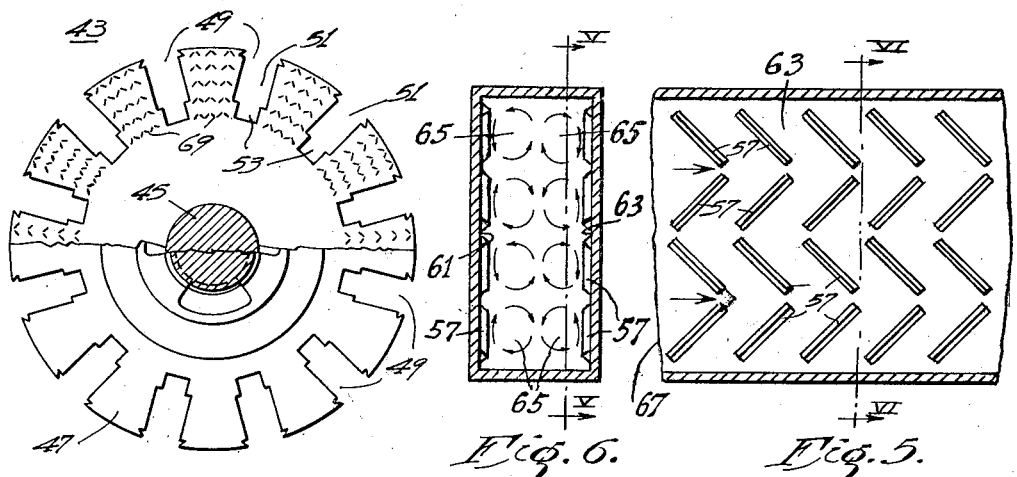
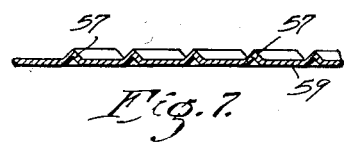
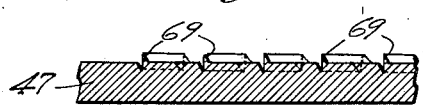
WITNESSES:　　　　　　　　　　　　　　　　INVENTOR
　　　　　　　　　　　　　　　　　　　　　Gaylord W. Penney.
　　　　　　　　　　　　　　　　　　　　　BY
　　　　　　　　　　　　　　　　　　　　　ATTORNEY Patented Dec. 17, 1935

2,024,743

UNITED STATES PATENT OFFICE 2,024,743

HEAT TRANSFER SURFACE

Gaylord W. Penney, Pittsburgh, Pa., assignor to Westinghouse Electric & Manufacturing Company, East Pittsburgh, Pa., a corporation of Pennsylvania Application September 18, 1934, Serial No. 744,522

7 Claims. (Cl. 257—1)

My invention relates to means for effecting heat transfer and specifically to an improved surface for transferring heat from a heated body to a fluid.

An object of my invention is to provide a simple and improved means for increasing the amount of heat transferred from one to the other between a relatively movable fluid and a solid body.

Another object of my invention is to increase the amount of heat taken up by a fluid moving past a surface of a heated body.

Another object of my invention is to increase the amount of heat absorbed by a fluid moving in a conduit between spaced opposing surfaces of a heated body.

Other objects of my invention will either be specifically pointed out hereinafter or will be apparent from a description of the invention.

In practicing my invention I provide sets of co-operating small ridges on the surface of a heated body past which the cooling fluid is caused to flow, the pattern of these ridges being of the herring-bone type.

In the drawings:

Fig. 3 is a view similar to Fig. 1, but taken through the rotor of a turbo-alternator;

Fig. 4 is a lateral sectional view therethrough taken on the line IV—IV of Fig. 3;

Fig. 5 is a longitudinal sectional view of an experimental conduit embodying my invention on the section-line V—V shown in Fig. 6;

Fig. 6 is a transverse sectional view of the conduit, on the section-line VI—VI of Fig. 5, with arrows indicative of the path of the fluid currents in the conduit, effected by the use of my invention;

Fig. 7 is a fragmentary view showing one method of forming the ridges when using a relatively thin laminated sheet of iron; and Fig. 8 is a schematic view of a solid body showing on one surface of the body, ridges made by another process.

Figures 1, 2:
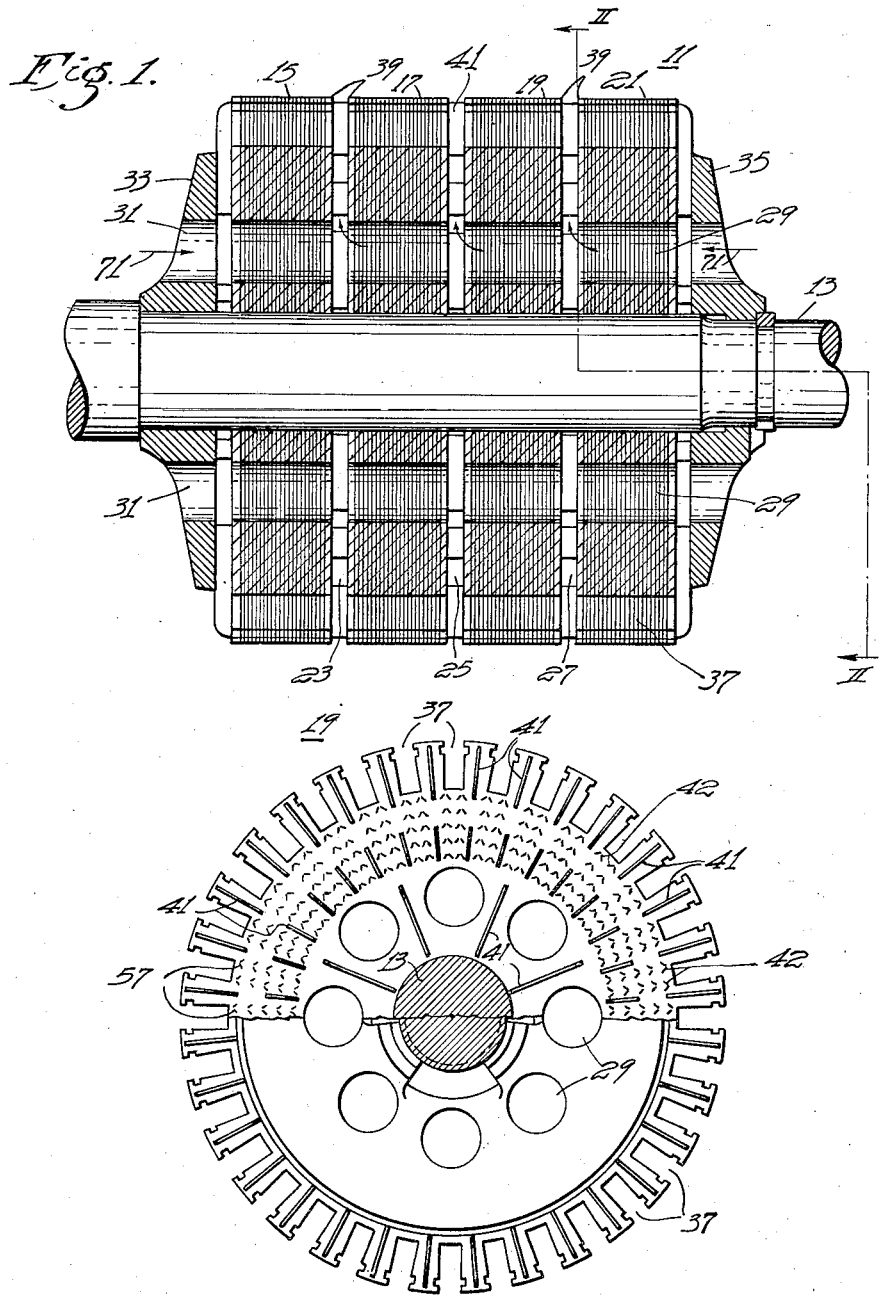
Figure 1 is a partial view in axial section of the rotor of a dynamo-electric machine utilizing a laminated rotor, the winding thereon being omitted for the sake of clearness.
Fig. 2 is a view in lateral section therethrough taken on the line II—II of Fig. 1.

While I shall hereinafter illustrate and describe my invention as applied to the cooling of heated bodies, the bodies being for instance the rotors of dynamo-electric machinery, I wish it to be understood that my invention is not limited to the transfer of heat from a solid body to a moving gaseous fluid or liquid, but that the same method may be used to transfer heat from a moving fluid to a solid body, such as may be useful in refrigeration processes. By the words "solid body", I do not desire to be limited to a solid homogeneous mass, but wish to include thereunder the usual laminated structures such as are used in dynamo-electric machinery.

In the cooling of parts, either the rotor or the stator, of dynamo-electric machinery, the usual method is to cause a flow of air, or possibly of some other cooling gaseous fluid, past either a single surface of the body or through a conduit including generally at least two opposed spaced surfaces of the body. It has long been recognized that the older method of increasing the pressure of the cooling fluid caused to enter the cooling conduits of the laminated body is not sufficient or is not as effective as is necessary, so that even though the amount of energy expended in causing a greater amount of the fluid to move past the heated surface is used, correspondingly better results are not obtained.

I have found that ordinary turbulences or eddies in a cooling medium, due to random protuberances or roughnesses on the heat-transfer surfaces, are not very effective in increasing the rate of flow of heat between the cooling medium and the heated body.

In my invention, however, I provide means on the surfaces of the body past which the fluid is moved which cause a part of the fluid to move in more or less predetermined or directed eddies or turbulences past the heated surface whereby to cause, so to speak, a cumulatively acting scouring action of the moving fluid at the surface of the body to more or less effectively remove the relatively thin layer of heated air which appears to cling to the surface of the body which it is desired to cool. This effect is obtained by providing relatively small ridges spaced apart within predetermined limits from each other and repeating themselves in a certain common or predetermined pattern on the surface of the body, whereby at least a portion of the fluid moving in a certain path past the heated surface will be caused to move in another and larger circuitous path relatively to the heated surface. It is my opinion that the use of the means provided by my invention to practice the process of improving the cooling of a heated surface causes two different and separate portions of the fluid to move in substantially parallel helical paths of increasing lateral area past the heated surface which it is desired to cool.

I have illustrated, generally only, in Fig. 1 of the drawings, a rotor shaft 13 having mounted thereon a plurality of discs or laminations which are grouped in a plurality of sets 15, 17, 19 and 21 in a manner well known in the art, which are spaced apart by cooling conduits 23, 25 and 27. In order to permit of mounting the individual laminations directly upon the shaft 13 and have ventilating openings through the assembly, they are each provided with a plurality of openings 29 therein which cooperate to provide inlet conduits 31 for cooling fluid which may be ordinary air when the dynamo-electric machine is of the open type. Two end flanges 33 and 35 are provided, one at each end of the assembled rotor core, and these may be held on the shaft 13 in any manner well known in the art.

I have illustrated a plurality of slots 37 in Fig. 2 of the drawings as being provided in each of the laminations, and the radial conduits 23 to 27, inclusive, are provided in a manner well known in the art as by the use of relatively heavy or thick laminations 39 at each end of the individual stacks of laminations 15 to 21, inclusive, spacing strips 41 being riveted thereagainst in a manner old in the art. I wish to here point out that I have illustrated and described a standard form of rotor useable either in an alternating-current dynamo-electric machine or in a direct-current type of machine, in order to illustrate the particular detail embodying my invention.

The opposing surfaces of the laminations defining the conduits are provided with a plurality of spaced ridges 42, and the edges of these ridges extend angularly relative to a radial line and are preferably located in a "herring-bone" pattern. The ridges may be spaced apart a distance on the order of ½" and have a height on the order of .03" when the axial width of the conduits is ⅜" or ½".

These pairs of ridges, located symmetrically, in axially-spaced sequence, longitudinally of the path of flow of the cooling fluid, and extending angularly relatively thereto, cause a part of the cooling fluid to be moved in a direction other than the normal or substantially straight path, the result being that such part of the fluid is caused to move in eddies or turbulences or helical paths and effect a "scouring" action on the thin layer of heated air usually adhering to a heated surface. The action and effect of these ridges will be hereinafter more fully set forth and explained.

Referring now to Fig. 3 of the drawings, I have there illustrated a rotor 43 of a turbo-alternator which rotor includes a shaft 45 having mounted thereon a plurality of relatively thick discs 47 of a standard type used in such turbo-rotors. A plurality of slots 49 are provided in the discs 47, the assembly being, of course, such that these slots are aligned when the plurality of discs are located in closely adjacent assembled position.

As shown in particularly Fig. 4 of the drawings, the slots are relatively deep and include an outer portion 51 of relatively large lateral area adapted to receive the insulated current-traversed conductors in a manner well known in the art, as well as an inner or bottom portion 53 of smaller lateral area to constitute an inlet conduit for a cooling fluid. The shaft 45 may have mounted thereon a fan 55 of any desired design and construction, it being understood that whatever showing I have made of this device is for illustrative purposes only to indicate that a forced ventilation is provided in cooperation with the rotor hereinbefore described.

Referring now to Fig. 5 of the drawings, I have there illustrated the pattern of a plurality of small ridges to be provided on the surface of a heated body which is to be cooled by the action of a cooling fluid moving past the heated surface. As shown, I prefer to use ridges of the type indicated at 57, and, for illustrative purposes, I may mention that these are spaced apart longitudinally of the path of flow of the cooling fluid, a distance on the order of one-half inch or somewhat less. I prefer to provide a plurality of such herring-bone ridges, as indicated in Fig. 5 of the drawings, and in the case of relatively small conduits, such as those hereinbefore described in connection with rotor 11 of Fig. 1, the ridges may have a height upon the order of .03 inch where the ducts are on the order of ⅜ inch wide. Reference to Fig. 7 of the drawings will show one method of providing these ducts in which a relatively thin lamination or disc 59 is indicated fragmentarily as having ridges 57 provided therein in one surface thereof as by use of a proper die and die block causing a recess in one surface with a ridge 57 on the other surface.

Fig. 6 is a cross-sectional view of a conduit, indicating the result of the use of a plurality of such herring-bone pattern ridges when the fluid is moved past two cooperating surfaces 61 and 63 which, for illustrative purposes, may be considered to be spaced apart on the order of ⅜ inch. It is my opinion, based upon tests of this method, that a plurality of individual eddies, indicated by the plurality of arcuate arrows 65, are formed with one eddy operative adjacent to one surface and another eddy operative adjacent to the other surface. It is, of course, to be understood that ridges are provided in both surfaces 61 and 63 in order to obtain this effect. It will be noted that certain of these eddies aid each other, and further that the angular positions of the ridges 57, relatively to the main path of flow of the fluid, as shown in Fig. 5, causes movements of a portion of the fluid or air angularly relatively to the main or normal flow path, because half of the ridges are inclined to the right, so that the air passing over them is given a spiral motion to the right, while the remaining ridges are inclined to the left, producing the oppositely directed eddies 65 shown in Fig. 6. Thus, the hereinbefore mentioned scouring action of a part of the moving fluid is effective to remove the relatively thin film of heated air, which tends to adhere to the surface of the heated body, and carry it to the center of the duct, while the cooler central air of the duct is brought into direct contact with the heat-transfer surfaces of the heated body, as shown in Fig. 6.

Tests which I have made indicate that these eddies have a cumulative effect on each other, increasing in turbulence, strength or violence as the cooling fluid moves along or through the conduit, as I have found that the cooling effect is greater a short distance from the entering end 67 than it is at that end. Of course, as the air is heated up in its general movement through the conduits, the amount or degree of cooling will ultimately again decrease, but I have found it possible to double and almost triple the amount of heat which I have been able to transfer from the surface of a heated body or from the two opposing surfaces of a conduit extending through a heated body when the conduit surfaces of the body were ridged, as shown in Fig. 5 of the drawings, as compared to the amount of heat I could transfer with the usual relatively smooth surfaces.

As noted above, the means utilized by me to provide the eddies are such as to provide directed cumulative turbulences, as distinguished from the random irregularities of ordinary rough surfaces which may be of such character as to counteract each other at some point or points in the conduit. The use of such ridges of a herringbone pattern on each of the conduit surfaces in a heated body is desirable, since I wish to have individual eddies for the respective spaced surfaces of the heated body. The path of a part of the cooling fluid may, in general, be described as that of an extended helix whose lateral area, or radius, increases cumulatively as the cooling fluid flows across the face of a solid body provided with my herringbone or inclined ridges or roughnesses.

Referring to Fig. 8 of the drawings, I have there illustrated a slightly different form of ridge 69 on the surface of a solid metal body which may, for instance, be one of the discs 47 of Fig. 3 of the drawings, these ridges 69 being made in a manner similar to those on an ordinary file. In other words, a cutting tool shaped something like a chisel may be used on the surface to provide depressions immediately ahead of the respective ridges 69.

Referring now again to Figs. 1 and 2 of the drawings, the ridges 57 of herring-bone pattern are shown particularly in Fig. 2 of the drawings, and the plurality of arrows 71 in the conduit 31 show the principal path of flow of the cooling fluid, the spacing strips 41 being effective, in a general way, to draw the air in from both ends of the rotor, as shown by the arrows 71, and outwardly through the conduits 23, 25 and 27.

Referring to Figs. 3 and 4 of the drawings, the fan assembly 55 will cause a flow of air indicated by the arrows 73 through the bottom portions 53 of the slots and outwardly through the annular recesses 75 in the intermediate discs which may be provided by machining out a part of the periphery at one surface of each of the heavy discs. The ridges 69 are shown particularly in Fig. 4 of the drawings, and it is to be understood, of course, that they are provided on both the opposed spaced surfaces at each side of the radial conduits 75.

As stated above, I have obtained very greatly improved cooling effects by the use of the means and method for cooling embodied in my invention, being able to carry off up to substantially three times as much heat as has ordinarily been the case if my invention had not been employed. While I have mentioned a specific height of the plurality of angularly-extending ridges, I do not desire to be limited thereto, as, in general, I desire to make the ridges of a height proportional to the distance between the opposing surfaces 61 and 63 of the cooling conduit.

The circuitous path, in general, of extended helical shape, through which a part of the cooling fluid is caused to move, provides a movement through a greater distance for a part of the fluid than that through which the remainder thereof is moved, and it is to be noted further that I provide such helical movement for a plurality of different parts or portions of the moving fluid simultaneously and movable in a generally similar manner, part of these portions aiding each other, this being particularly the case at the central portion of the duct, as may be seen by reference to Fig. 6.

Various further modifications may be made in the device embodying my invention without departing from the spirit and scope thereof, and I desire, therefore, that only such limitations shall be placed thereon as are imposed by the prior art or are set forth in the appended claims.

I claim as my invention:

1. A solid body having at least one heat transferring surface adapted to be exposed to a moving fluid and having a plurality of spaced, symmetrically located pairs of oppositely inclined ridges on said surface.

2. Heat-exchange means comprising a body having a heat-exchange surface, adapted to have a heat-exchange fluid pass over said surface, characterized by said surface having a plurality of repetitive roughnesses, inclined to the general direction of fluid-flow, and having a certain common pattern, whereby cumulative directed eddies are produced in the heat-exchange fluid as it passes over said heat-exchange surface.

3. Heat-exchange means comprising a body having a heat-exchange surface, adapted to have a heat-exchange fluid pass over said surface, characterized by said surface having a plurality of repetitive roughnesses, inclined to the general direction of fluid-flow, and having a certain common pattern, whereby cumulative directed eddies are produced in the heat-exchange fluid as it passes over said heat-exchange surface, approximately half of said roughnesses being inclined to the right, and approximately half of said roughnesses being inclined to the left.

4. Heat-exchange means comprising a body having a heat-exchange surface, adapted to have a heat-exchange fluid pass over said surface, characterized by said surface having a plurality of repetitive roughnesses, so inclined to the general direction of fluid-flow as to produce a plurality of oppositely rotating spirals in the heat-exchange fluid as it passes over said heat-exchange surface.

5. Heat-exchange means comprising a body having a duct therein, formed between opposite heat-exchange surfaces, adapted to have a heat-exchange fluid pass through said duct, characterized by said surfaces both having a plurality of repetitive roughnesses thereon, inclined to the general direction of fluid-flow according to a fixed pattern, such as to produce a plurality of oppositely rotating spirals carrying the surface-portions of the heat-exchange fluid to the center of the duct, and central portions thereof to said opposite heat-exchange surfaces.

6. Heat-exchange means comprising a body having a duct therein, formed between opposite heat-exchange surfaces, adapted to have a heat-exchange fluid pass through said duct, characterized by said surfaces both having a plurality of repetitive roughnesses thereon, inclined to the general direction of fluid-flow according to a fixed pattern, such as to produce a plurality of oppositely rotating spirals carrying the surface-portions of the heat-exchange fluid to the center of the duct, and central portions thereof to said opposite heat-exchange surfaces, the roughnesses on the two opposite heat-exchange surfaces of the duct being so inclined, relatively to each other, that oppositely rotating spirals will be produced, adjacent each other, by corresponding opposed portions of the two surfaces.

7. Heat-exchange means comprising a body having a heat-exchange surface, adapted to have a heat-exchange fluid pass over said surface, characterized by said surface having a fixed pattern of eddy-forming roughnesses in an approximately herringbone design, with the points of the herringbone pointing in lines which are approximately parallel to a line representing the general path of fluid-flow.

GAYLORD W. PENNEY.